(12) United States Patent
Na et al.

(10) Patent No.: US 10,892,066 B1
(45) Date of Patent: Jan. 12, 2021

(54) FILM, CONDUCTIVE FILM AND THE USE THEREOF

(71) Applicant: LMS Co., Ltd., Pyeongtaek-si (KR)

(72) Inventors: Hoseong Na, Pyeongtaek-si (KR); Seongyong Yoon, Pyeongtaek-si (KR); Jitae Kim, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/934,286

(22) Filed: Jul. 21, 2020

(30) Foreign Application Priority Data

Dec. 6, 2019 (KR) .................. 10-2019-0161173

(51) Int. Cl.
*H01B 5/14* (2006.01)
*G02B 5/04* (2006.01)

(52) U.S. Cl.
CPC .............. *H01B 5/14* (2013.01); *G02B 5/045* (2013.01)

(58) Field of Classification Search
CPC .................................. H01B 5/14; G02B 5/045
USPC ......................................................... 174/268
See application file for complete search history.

(56) References Cited

U.S. PATENT DOCUMENTS

| 6,741,019 B1* | 5/2004 | Filas ...................... H01J 1/304 313/309 |
| 2010/0028633 A1* | 2/2010 | O'Rourke .............. B82Y 10/00 428/210 |
| 2011/0312123 A1* | 12/2011 | Jeong .............. H01L 31/022425 438/98 |
| 2015/0255183 A1* | 9/2015 | Kim .................... H01L 51/5206 428/312.6 |
| 2016/0126375 A1* | 5/2016 | Morikawa ........... H01L 31/0508 136/244 |
| 2016/0346839 A1* | 12/2016 | Ishii .................... C09B 67/0097 |
| 2018/0196538 A1* | 7/2018 | Zhang .................... B05D 3/007 |
| 2019/0220151 A1* | 7/2019 | Mitsui .................... B32B 23/20 |

* cited by examiner

*Primary Examiner* — Sherman Ng
(74) *Attorney, Agent, or Firm* — Polsinelli PC

(57) ABSTRACT

The present disclosure is related to a film and a conductive film. The film of the present disclosure not only is optically transparent but also has excellent electrical conductivity and adhesion between the layers at the same time. Moreover, the conductive film of the present disclosure is optically transparent and has excellent electrical conductivity, adhesion between the layers and improved light extraction efficiency at the same time.

10 Claims, 3 Drawing Sheets

_US 10,892,066 B1_

FILM, CONDUCTIVE FILM AND THE USE THEREOF

CROSS REFERENCE TO RELATED APPLICATION

This application claims priority under 35 U.S.C. 119 to Korean Patent Application No. 10-2019-0161173, filed on Dec. 6, 2019, which is hereby incorporated by reference in its entirety.

BACKGROUND

Field of the Disclosure

The present disclosure is related to a film, a conductive film and use of the films.

Description of the Background

A transparent conductive film (TCF) is applied in various technical fields such as a display device including a Liquid Crystal Display (LCD) and an Organic Light Emitting Display (OLED), a transparent heater and a solar cell, etc.

Although Indium Tin Oxide (ITO) is applied as the main component of the material for transparent conducting film, manufacturing cost is relatively high for ITO due to its low abundance. Therefore, development of various materials is underway to replace ITO.

As a transparent conductive material for the replacement of ITO, carbon nanotube, silver nanowire and metal mesh, etc. have been considered. However, the material stated above is not appropriate for the technical trend which requires satisfying all of optical properties, electrical properties and flexibility. In particular, to apply a metal mesh, an Optically Clear Adhesive (OCA) is necessary to bond to the metal mesh.

However, because bonding resistance is increased due to reduction of velocity of electron mobility and light extraction efficiency of an element is decreased if the OCA is applied, there is a limit for the metal mesh to replace ITO.

SUMMARY

Accordingly, the present disclosure is directed to film, conductive film and the used thereof that substantially obviate one or more of problems due to limitations and disadvantages of the prior art.

More specifically, the present disclosure is to provide a film to have excellent electric conductivity and interlayer adhesion while it is optically transparent at the same time.

In addition, the present disclosure provides a film to have improved light extraction efficiency while having excellent electric conductivity and interlayer adhesion and being optically transparent at the same time.

Also, the present disclosure provides a film comprising a support layer wherein at least a certain portion of the supporting layer is curved; a pattern layer formed on the support layer having a repeated structure of a protrusion wherein the protrusion is formed toward the support layer and an average pitch of the protrusion is 30 µm or more; and a grid electrode layer formed on the pattern layer having an adhesive including a nanowire wherein the grid electrode is formed in the adhesive.

The present disclosure provides the film further comprising a polymer in the support layer; a shape of the protrusion wherein the shape of a cross-sectional area of the protrusion is increased to a direction from the support layer to the grid electrode layer; a prism pattern as a pattern of the pattern layer having an inclination angle range of 10 to 85; a high refractive index particle in the protrusion of the pattern layer; and a filling layer having an adhesive and a nanowire wherein the filling layer is formed to subside the pattern layer and to planarize a surface adjacent to the pattern layer and the support layer.

The present disclosure provides the film further comprising a second pattern layer formed on the grid electrode layer having a repeated structure of a protrusion wherein the protrusion is formed toward the grid electrode layer wherein an average pitch of the second pattern layer of the protrusion is 30 µm or more; and a prism pattern as a pattern of the second pattern layer having an inclination angle range of 10 to 85 degrees.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate aspects of the disclosure and, together with the description, serve to explain the principles of the disclosure.

In the drawings.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

Figure 1:
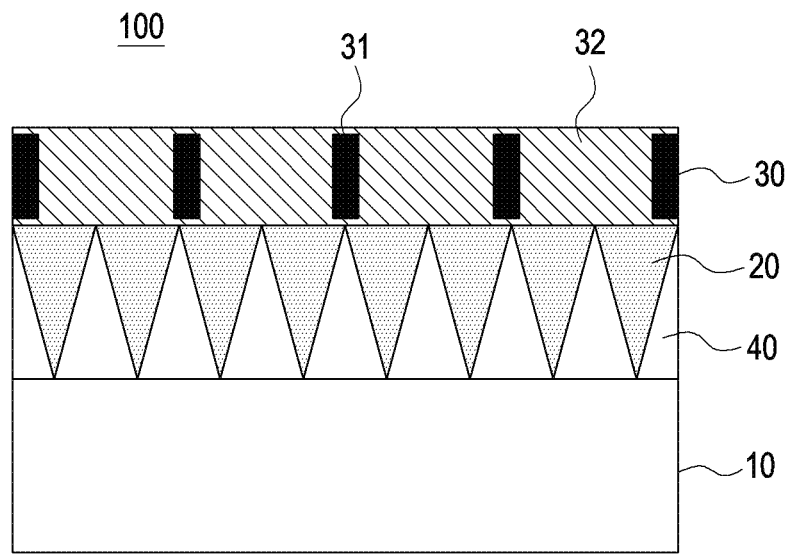
FIG. 1 is a schematic view of the film in the present disclosure.

The present disclosure is related to a film. FIG. 1 is a schematic view of the film and the film of the present disclosure will be specifically described in the following by referring to the attached drawings. The film (100) of the present disclosure comprises a support layer (10); a pattern layer (20) formed on the support layer (10); and a grid electrode layer (30).

When "one member is formed on the other member," is stated, it includes not only the meaning "one member is formed on the other member with attachment" but also the meaning "the one member is formed on the other member and an additional member can exist between the one member and the other member."

Figure 2:
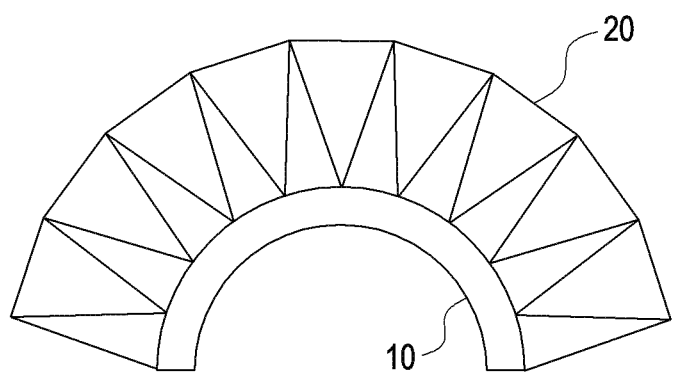
FIG. 2 illustrates an aspect of the film in the present disclosure.

The film (100) of the present disclosure has an excellent interlayer adhesion, specifically, the adhesion between the support layer (10) and the grid electrode layer (30). In particular, if at least a certain portion of the supporting layer is curved, the adhesion between the support layer (10) and the grid electrode layer (30) is secured by the pattern layer (20) (shown in FIG. 2). The meaning of "at least a certain portion of the supporting layer is curved" is that at least a certain portion is either a concave surface or a convex surface. For example, the support layer (10) in the present disclosure can have convex surface facing the pattern layer (20).

The adhesion between the support layer (10) and the grid electrode layer (30) can be secured by the pattern layer (20) as stated above. That is because of the property caused by having a repeated structure of protrusion of the pattern layer (20). As a result, the pattern layer (20) is formed on the support layer (10) and has a repeated structure of a protrusion. Although the protrusion can be protruded to the support layer (10) or the grid electrode layer (30), it is appropriate to be protruded to the support layer (10). The meaning of "having a repeated structure of protrusion of the pattern layer (20)" may mean that the pattern layer (20) has a plurality of protrusions and a plurality of protrusions exist spaced by a pre-determined distance.

The film (100) of the present disclosure comprises the grid electrode layer (30). The grid electrode layer (30) is formed on the pattern layer (20). The film (100) may have a predetermined electrical conductivity by the grid electrode layer (30). The grid electrode layer (30) comprises at least an adhesive (32) and grid electrode (31) formed in the adhesive (32)

The adhesive (32) can be unlimitedly utilized if it is optically transparent. For example, acryl-based adhesive, silicone-based adhesive, urethane-based adhesive, and urethane acrylate-based, etc. can be used as the adhesive (32).

The grid electrode (31) means the electrode including a conductive region formed by conductive material and a non-conductive region which is empty space where no conductive material exists. For example, when the grid electrode (31) is projected from the top, the area of the conductive region is 30% or less, 20% or less or 8% or less of the grid electrode (31)'s area. In other words, the grid electrode (31) may mean the electrode including at least the conductive region and the non-conductive region formed by the empty space. The conductive region of the grid electrode (31) can form a pattern. Specifically, the conductive region and the non-conductive region in the grid electrode (31) may repeatedly exist in the form of "conductive region—non-conductive region—conductive region."

As the grid electrode (31) is formed in the adhesive (32), for example, the grid electrode (31) may be formed on the adhesive (32) and the grid electrode (31) and the adhesive (32) may exist in the same layer. For the latter case, because the non-conductive region of the grid electrode (31) is empty space, the adhesive (32) may fill the empty space.

The adhesive (32) in the grid electrode layer (30) comprises a nanowire. The inventors of the present disclosure have found that the film (100) in the present disclosure can show the excellent electrical conductivity when the adhesive (32) includes the nanowire in the grid electrode layer (30) as stated above. The nanowire may be specifically a conductive nanowire. Nanowire means to have a nano-structure which has its average diameter in nanometer unit, and specifically, has the average diameter of several nanometers to hundreds of nanometers. And, nanowire means a nano-structure having the ratio (L/D) between length (L) and width (D) of 100 or more or 1000 or more. In another aspect, nanowire means a nano-structure having an unlimited length which is beyond hundreds of nanometers despite having limited thickness or diameter which is under tens of nanometers.

As described above, the adhesion between the support layer (10) and the grid electrode layer (30) can be secured by the pattern layer (20) in the film (100) of the present disclosure. This is because the adhesion can be adjusted by spacing distance among the protrusions formed in the pattern layer (20). Specifically, the inventors of the present disclosure have found that the adhesion between the support layer (10) and the grid electrode layer (30) can be secured when the average pitch of the protrusions is 30 μm or more. If the average pitch of the protrusions is below the range as stated above, specifically if the support layer (10) has at least a curved surface member, there is a problem of a peeling phenomenon due to the adhesion failure between the support layer (10) and the grid electrode layer (30). In another aspect, the average pitch may be 35 μm or more, 40 μm or more, 45 μm or more or 50 μm or more and 200 μm or less, 190 μm or less, 180 μm or less, 170 μm or less, 160 μm or less, 150 μm or less, 140 μm or less, 130 μm or less, 120 μm or less, 110 μm or less, 100 μm or less, 90 μm or less, 80 μm or less or 70 μm or less. The average pitch may mean an average of a shortest distance between the two most adjacent protrusions among a plurality of protrusions existing in the pattern layer (20).

As described above, it is proper to use easily bendable material by external force such as polymer material for the support layer (10) because the support layer (10) has at least one curved surface. Therefore, the support layer (10) can include a polymer. The polymer for the support layer (10) can be polyethylene terephthlalate (PET), polyethylene naphthalate (PEN), polyether sulfone (PES), polyimide (PI), polyarylate (PAR), polycarbonate (PC), polyurethane (PU), polyolefin (PO) and polyacrylate (PA), etc. and PET is commonly used. The support layer (10) can be a structure where two or more of the polymer layers are stacked.

The thickness of the support layer (10) is not particularly limited and it can be properly adjusted within the range for securing the appropriate adhesion with the grid electrode layer (30) by the pattern layer (20). The thickness of the support layer (10) can be, for example, 15 μm or more, 30 μm or more, 40 μm or more or 60 μm or more and 200 μm or less, 160 μm or less, 120 μm or less or 80 μm or less.

If the thickness of a certain layer is not consistent in the present disclosure, the thickness of that layer can mean the minimum thickness, the maximum thickness or the average thickness of that layer.

For securing the proper adhesion between the support layer (10) and the grid electrode layer (30), the shape of the pattern layer (20) also can be properly changed. Particularly, the shape of the protrusions included in the pattern layer (20) can be properly changed. For example, at least one protrusion of the pattern layer (20) can have a shape to consistently maintain its cross-section along a thickness direction, for example, a direction toward the electrode layer in the grid electrode layer (30) or a reverse direction to the electrode layer and can also have a shape to have a different cross-section along the direction. Meanwhile, when the support layer (10) has at least a curved surface, at least one protrusion included in the pattern layer (20) can have a shape where the area of the cross-section is increased to the direction toward the electrode layer from the pattern layer (20) (the area of the cross-section is decreased to the direction toward the support layer (10) from the grid electrode layer (30) for securing the adhesion between the support layer (10) and the grid electrode layer (30).

The shape of the pattern layer (20), specifically, the shape of the protrusion included in the pattern layer (20) is not limited. As described above, the protrusion should have the shape as long as its area of the cross-section is increased to the direction toward the electrode layer. For example, a pattern for the pattern layer (20), specifically, the pattern for the protrusion of the pattern layer (20) can be a prism pattern, a lenticular lens pattern, a repeated rectangular horn pattern, a repeated square pillar pattern, a repeated half-spherical protrusion pattern, a repeated elliptical pillar pattern and a repeated circular pillar pattern, etc.

The thickness of the pattern layer (20) is also not limited. The thickness of the pattern layer (20) can be properly adjusted to secure the proper adhesion between the support layer (10) and the grid electrode layer (30). For example, the thickness of the pattern layer (20) can be within the range of 5 μm to 200 μm or 15 μm to 200 μm. Because the protrusion exists in the pattern layer (20), the thickness of the pattern layer (20) and the protrusion height do not need to be matched. In one aspect, at least one protrusion in the pattern layer (20) can contact with the support layer (10) since the thickness of the pattern layer (20) and the protrusion height is the same but it can exist spaced with a pre-determined distance since the protrusion height is smaller than the thickness of the pattern layer (20). Consequently, the protrusion height can be within the same range of thickness as the thickness of the pattern layer (20) and it can be smaller thickness than the thickness of the pattern layer (20) even within the thickness range.

The material constituting the protrusion is not also limited. In one aspect, the protrusion can be formed by a polymer resin. As for the polymer resin, it can be an acrylic resin, a silicon-based resin, a polycarbonate-based resin and a urethane-based resin, etc.

As described above, although the protrusion in the pattern layer (20) can have various shapes, the shape of the protrusion can be a triangle shape to secure the proper adhesion between the support layer (10) and the grid electrode layer (30) and furthermore to increase the efficiency of the light extraction of the film (100). In other words, the pattern of the pattern layer (20) can be a prism pattern. When the protrusion has the triangle shape, its vertex can be formed to face the support layer (10) and the base of the triangle can be the shape adjacent to the grid electrode layer (30). The protrusion in the pattern layer (20) can have the shape which is the triangle shape where the area of the cross-section is decreased to the direction toward the support layer (10) from the grid electrode layer (30) and a point where the protrusion is close to the support layer (10) can be defined as a vertex of the triangle. When the pattern for the pattern layer (20) is the prism pattern, a pitch of the protrusion can mean a shortest distance between the vertexes of the most adjacent triangle among a plurality of triangles constituting the prisms.

If the pattern for the pattern layer (20) is the prism pattern, a tilt angle of the prism pattern also can be adjusted within the proper range for securing the adhesion between the support layer (10) and the grid electrode layer (30). For example, the tilt angle of the prism pattern is within the range of 10° to 85°. In another aspect, it can be 15° or above, 20° or above, 25° or above, 80° or less, 75° or less and 70° or less. The tilt angle can mean an angle to form an acute angle between any one of two sides forming the vertex of the prism and the base of the prism.

In one aspect, an additional substance can be added in the pattern layer (20) for securing the adhesion between the support layer (10) and the grid electrode layer (30) and improving the light extraction efficiency for the device utilizing the film (100) of the present disclosure at the same time. More specifically, the protrusion of the pattern layer (20) can additionally include high refractive index particles. When the film (100) of the present disclosure is adapted for the display device by the protrusion of the pattern layer (20) including the high refractive index particles, it can be possible for the light emitted from the device to be additionally dispersed by the high refractive index particles and thus, the light extraction efficiency of the device utilizing the film (100) of the present disclosure can be improved.

The high refractive index particles can be a substance where the refractive index at a certain wavelength is higher than the other material, specifically, the material constituting the protrusion. For example, the refractive index of the high refractive index particles is within the range of 1.1 to 3, 1.5 to 3 or 1.5 to 2.5. The reference wavelength of the refractive index is not particularly limited and for example, it can be any one of wavelengths within the range of 300 nm to 700 nm or approximately 550 nm.

The high refractive index particles can be dispersed in the protrusion. The meaning of "the high refractive index particles can be dispersed in the protrusion" is to include the status where the particles in the protrusion are not dissolved in the protrusion or a plurality of particles are not aggregated with each other and are isolated in the protrusion.

The types of the high refractive index particles in the pattern layer (20), specifically in the protrusion of the pattern layer (20), are not limited, and publicly available particles usually known as high refractive index particles can be freely utilized. For example, as for the high refractive index particles, titanium oxide, zirconium oxide or cerium oxide, etc. can be used. The shape of the particles is also not limited and the high refractive index particles can have spherical or amorphous types of shape, etc.

The size of the high refractive particles is also not limited. Various particle sizes such as from several nanometers to hundreds of micrometers size can be used as the high refractive index particles included in the protrusion of the present disclosure. For example, the average size of the high refractive index particles can be 1 nm or more, 10 nm or more of 100 nm or more and 10 μm or less, 1 μm or less, 500 nm or less or 100 nm or less.

The material constituting the grid electrode (31) is not limited. Generally, metal can be used as a conductive material. The grid electrode (31), specifically, the conductive region of the grid electrode (31) can include at least one of copper, aluminum, silver and nickel.

As described above, the grid electrode layer (30) can include the adhesive (32) including the nanowire and the grid electrode (31) formed in the adhesive (32) and the grid electrode (31) can be formed on the surface of the adhesive (32) or formed inside of the adhesive (32), or the non-conductive region of the grid electrode (31) can be filled with the adhesive (32). Particularly, the adhesive (32) can form a separate concavo-convex structure where the non-conductive region of the grid electrode (31) is filled with the adhesive (32) and the concave (凹) part of the concavo-convex (凹凸) structure is filled with the conductive region of the grid electrode (31).

The nanowire used in the present disclosure as described above has a ratio (L/D) between the normal length (L) and the width (D) being 100 or above and when such the nanowire is used, the film (100) can show a high optical transmission rate and a proper conductivity and simultaneously it has the advantage of excellent adhesion with the support layer (10) at the same time.

The material constituting the nanowire is also not limited. In one aspect, the nanowire can include conductive metal such as silver, aluminum, tungsten, nickel, copper, gold or platinum; metal oxide such as zinc oxide; conductive metal oxide including metal doped oxide composite where the metal such as aluminum, gallium, tin, indium is doped.

The occupied ratio of the nanowire in the grid electrode (31) is also not particularly limited. For example, the ratio of the nanowire may be properly adjusted for securing conductivity of the film (100) and considering light transmission rate and the adhesion with the support layer (10). In one aspect, the grid electrode layer (30) can include the adhesive (32) as a main component. The meaning of "include the adhesive (32) as a main component" can include the ratio of the adhesive (32) of 50 wt % or more, 55 wt % or more, 60 wt % or more, 65 wt % or more, 70 wt % or more, 75 wt % or more, 80 wt % or more, 85 wt % or more, or 90 wt % or more and 99 wt % or less, 98 wt % or less, 97 wt % or less, 96 wt % or less, or 95 wt % or less with the reference of a total weight of the grid electrode layer (30). In addition, the grid electrode layer (30) can include the ratio of the nanowire of 15 parts by weight or more, 16 parts by weight or more, or 17 parts by weight or more and 50 parts by weight or less, 30 parts by weight or less or 28 parts by weight or less with the reference of the adhesive (32) 100 parts by weight.

The thickness of the grid electrode layer (30) in one aspect can be within the range of 1 μm to 10 μm. The thickness in another aspect can be 2 μm or more or 3 μm or more and 9 μm or less, 8 μm or less or 7 μm or less. It is appropriate to maintain the thickness of the grid electrode layer (30) being within the range as described above to secure the proper transmission rate of the film (100), the electrical conductivity and the adhesion between each of the layers. The thickness of the grid electrode layer (30) can be a thickness of the adhesive (32) comprising the nanowire and a single layer forming the grid electrode (31). As described above, the thickness of the grid electrode layer (30) can be the maximum thickness, the minimum thickness or the average thickness if it is not consistent.

The film (100) can include additional layers. For example, the film (100) can additionally include a filling layer (40). The filling layer (40) is formed to subside the pattern layer (20) while it exists between the support layer (10) and the pattern layer (20) and it is a layer to planarize the surface where the pattern layer (20) is adjacent. That is, a region except for a region where the protrusion is formed in the pattern layer (20) may be referred to as the filling layer (40). Thus, the thickness of the filling layer (40) also can be substantially the same as the thickness of the pattern layer (20).

In the filling layer (40), the meaning of "to planarize the surface where the pattern layer (20) is adjacent" can be to form a single layer by filling the region except for the protrusion in the pattern with the filling layer (40).

The composition of the component in the filling layer (40) also can be properly adjusted to secure the proper conductivity, optical transmission rate and adhesion between the layers of the film (100). In one aspect, the filling layer (40) can include the adhesive (32) and the nanowire. The explanation of the adhesive (32) and the nanowire for the filling layer (40) can be repeated with the explanation of the adhesive (32) and the nanowire for the grid electrode layer (30) as described above. The composition of the adhesive (32) and the nanowire for the filling layer (40) can be the same as the composition of the adhesive (32) and the nanowire for the grid electrode layer (30) or can be different to the composition for the grid electrode layer (30) while it satisfies the composition condition as described above.

Figure 3:
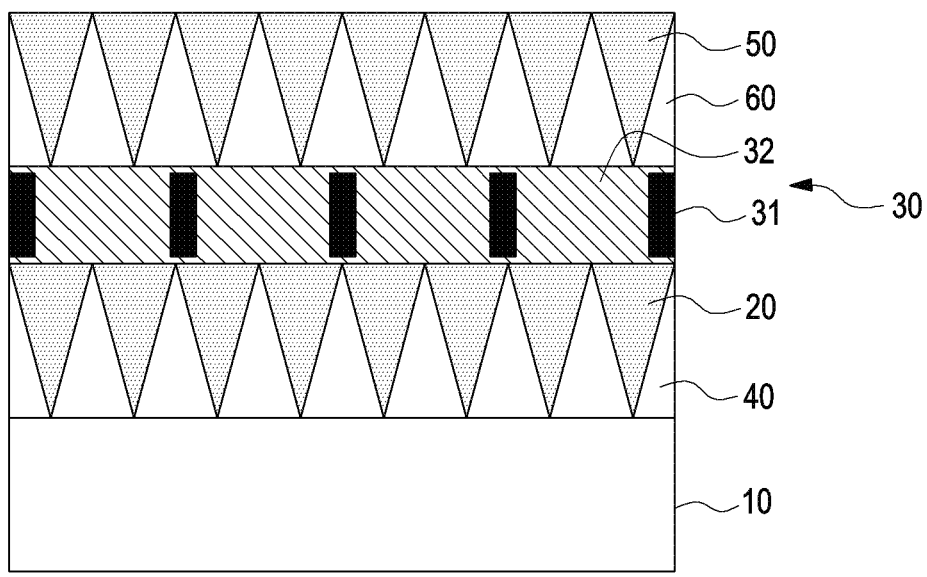
FIG. 3 is a schematic view of the conductive film in the present disclosure.

The present disclosure is also related to a conductive film (200). The conductive film (200) in the present disclosure can include at least one additional pattern layer (50) formed on the film (200) (shown in FIG. 3).

The conductive film (200) according to the present disclosure can have excellent electrical conductivity. Therefore, the surface resistance of the conductive film (200) of the present disclosure can be, for example 100 Ω/sq or less. In another aspect, the surface resistance can be 90 Ω/sq or less, 80 Ω/sq or less, 70 Ω/sq or less, 65 Ω/sq or less or 60 Ω/sq or less and it can be, for example, 1 Ω/sq or more, 5 Ω/sq or more, 10 Ω/sq or more, 20 Ω/sq or more, 30 Ω/sq or more, 40 Ω/sq or more or 50 Ω/sq or more despite the lower value not being particularly limited because the lower the lower value the better. The surface resistance of the conductive film (200) can be controlled by the type and the composition of the component consisting of each layer of the conductive film (200). The surface resistance can be measured by a publicly known method—for example—ASTM F1844.

The conductive film (200) also has excellent optical properties, for example, it has excellent transparency. Therefore, the conductive film (200), for example, can have a transmission rate of 60% or higher to 550 nm wavelength light. In another aspect, the transmission rate can be 65% or higher, 70% or higher, 75% or higher, 77% or higher or 80% or higher. Also, it can be 95% or lower, 92% or lower, 90% or lower or 85% or lower because the higher the transmission rate value the better. The transmission rate can be achieved by controlling the composition type and its ratio of the component for the respective layer of the film (100) and the thickness of each layer, etc. The transmission rate can be measured by a publicly known method—for example—ASTM D1003 or D1004.

As described above, the conductive film (200) is a structure to include an additional pattern layer (50) in the film (100) describe above. Thus, the conductive film (200) includes at least a support layer (10); a first pattern layer (20) formed on the support layer (10); a grid electrode layer (30) formed on the first pattern layer (20); and a second pattern layer (50) formed on the grid electrode layer (30). Because the conductive film (200) additionally includes the second pattern layer (50), the second pattern layer (50) can provide additionally improved light extraction efficiency. The second pattern layer (50) can be called a light extraction layer in some cases.

The first pattern layer (20) of the conductive film (200) can be corresponding to the pattern layer as described above and the additional pattern layer included in the conductive film (200) can be the second pattern layer (50). Thus, the explanation for the support layer (10), the grid electrode layer (30) and the filling layer (40) also can be used for the explanation for the conductive film (200) of the present disclosure.

In addition, the explanation for the second pattern layer (50) of the conductive film (200) also can be used as the same for the explanation of the pattern layer (20) of the film (100), in other words, the first pattern layer (20) of the film (100) unless explaining differently below.

The direction of a protrusion shape for the second pattern layer (50) can be the same or the opposite direction of the protrusion shape for the first pattern layer (20) in the conductive film (200). Specifically, the protrusion of the first pattern layer (20) can be formed to the direction from the grid electrode layer (30) toward the support layer (10) and the protrusion of the second pattern layer (50) can be formed to the opposite direction of its first pattern layer (20), in other words, the direction from the grid electrode layer (30) toward the second pattern layer (50). It is also appropriate for the protrusion of the second pattern layer (50) to be formed to approximately the same direction as the protrusion of the first pattern layer (20) to improve the light extraction efficiency.

In one aspect, the shape of the protrusion respectively formed on the first and the second pattern layer (20, 50) can be properly adjusted. For example, the shape of the protrusion of the second pattern layer (50) can have a shape where the cross-sectional area of the protrusion is increased or decreased to a direction from the support layer (10) to the grid electrode layer (30) and it is proper to be increased for securing improved light extraction efficiency.

Except for the explanation stated above, the explanation as to each layer of the film (100) can be used for the conductive film (200) of the present disclosure. In one aspect, the conductive film (200) can additionally include the second pattern layer (50) in the film (100); the shape, the type, the material and the composition for the second pattern layer (50) can refer to the same explanation as described for the first pattern layer (20); the first and the second pattern layer (20, 50) can be the same or different pattern layers while satisfying the same conditions. Moreover, the conductive film (200) can additionally include a second filling layer (60) filling the grid electrode layer (30) between the grid electrode layer (30) and the pattern layer (20).

The present disclosure is also related to an electrode included in the conductive film (200). As described above, because the conductive film (200) of the present disclosure has excellent electrical conductivity, it is advantageous to utilize such film (100). The conductive film (200) itself can be referred to as the electrode and the electrode can include a publicly known element additionally included in the conductive film (200) for the electrode configuration.

The present disclosure is also related to a usage of the conductive film (200). The conductive film (200) is applicable to various fields such as a display device, a touch panel, a solar cell, etc. The detailed description for the display device, the touch panel and the solar cell will be omitted because it is well known to the public.

1. Adhesion Evaluation

The adhesion of the film (100) according to an aspect and a comparative example was measured as follows.

(1) Prepare the specimen for the adhesion evaluation by cutting the film (100) of the aspect and the comparative example to 25 mm×25 mm (width×length) size, respectively. (2) Measure the degree of lifting of the grid electrode layer (30) from the support layer (10) in a condition where the maximum curvature radius became 2R by bending the specimen 10,000 times with the speed of 1 Hz using a bending tester.

2. The Change Rate of Resistance

The change rate of Resistance of the film (100) according to the aspect and the comparative example was evaluated as follows. It can be shown inn whether the adhesion between the pattern layer (20) and the support layer (10) in the film (100) according to the aspect and the comparative example was improved through the change rate of resistance.

(1) Prepare the specimen for the change rate of resistance evaluation by cutting the film (100) of the aspect and the comparative example to 25 mm×25 mm (width×length) size, respectively.

(2) Connect a wire to both ends of the grid electrode (31) in the specimen and measure the resistance using a two point probe tester (Hitester 3803, Hioki Company).

(3) Perform the bending test as mentioned in "1. Adhesion Evaluation" above.

(4) Measure the resistance of the specimen prepared by step (3) utilizing the step (2) method as stated above.

(5) Compare the value of the resistance measured from step (4) and step (2).

3. Brightness

The brightness of the film (100) according to the aspect and the comparative example was measured as follows.

(1) Prepare a specimen for the brightness measurement by cutting the film (100) of the aspect and the comparative example to A4 size.

(2) Measure the brightness of the specimen using a color luminance meter (BM-7, Topcon Company, LED lamp) according to the manual for the equipment.

Preparation Example 1. Adhesive Composition

An adhesive composition was prepared by mixing silver nanowire, acrylic adhesive (POA-N4601, Aekyung Chemical Company), solvent (mixture of ethyl acetate and toluene in 75:25 weight ratio) and epoxy-based polymerization initiator (AK-5EX, Aekyung Chemical Company) with a weight ratio of 1.5:7.5:90.81:0.19 (the silver nanowire: the acrylic adhesive: the solvent: the epoxy polymerization initiator) using a vortex mixer for 3 minutes.

Preparation Example 2. Coating Composition (A)

A coating composition (A) was prepared by properly mixing and blending benzyl acrylate and phosphine group polymerization initiator (TPO, 2,4,6-Trimethylbenzoyl-diphenylphosphine oxide).

Preparation Example 3. Coating Composition (B)

A coating composition (B) was prepared by the same method as the Preparation Example 2 except for additionally mixing and blending the proper amount of dispersion solution where the high refractive index particles ($ZrO2$) were dispersed in the proper solvent.

Aspect 1. Film

The first pattern layer (20) having a prism pattern protrusion formed on the support layer (10) (PET film of thickness about 75 μm, SK Co. Ltd.) by silicone resin was prepared. The vertex of the prism pattern was formed toward the support layer (10) and its average pitch was approximately 70 μm and its inclination angle was approximately 30°.

Figure 4:
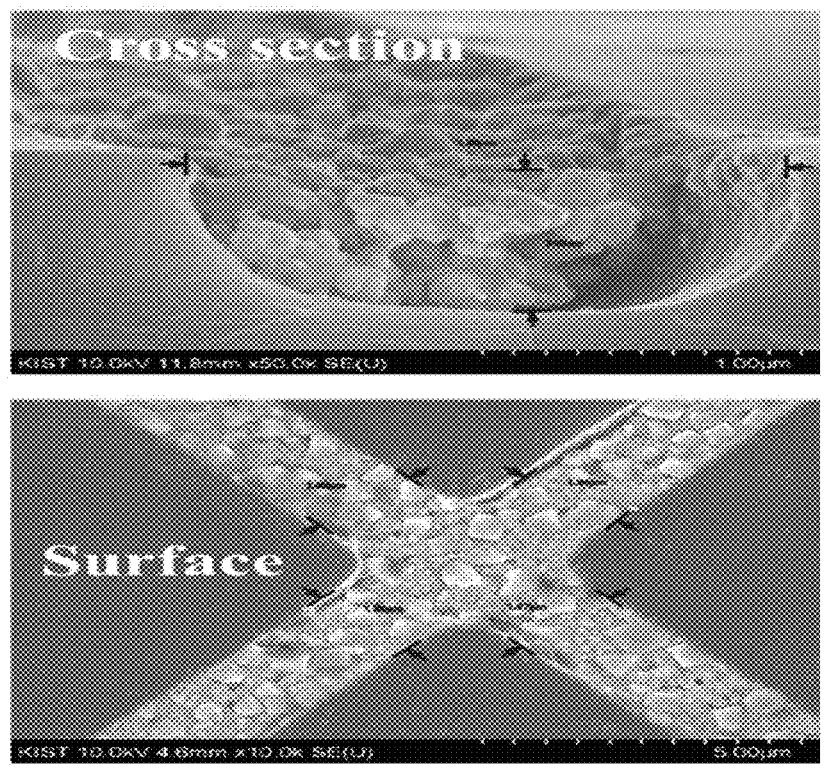
FIG. 4 is an SEM photograph of the grid electrode layer applied in the present disclosure.

The filling layer (60) was formed by depositing the adhesive composition according to the Preparation Example 1 on the first pattern layer (20) on the support layer (10) and performing heat-treatment for a proper time with a proper temperature. Consequently, the grid electrode layer (30) was formed by depositing the adhesive composition according to the Preparation Example 1 on the first pattern layer (20), placing a copper grid electrode (a mesh pattern grid electrode having a line width of approximately 2-3 μm and a depth of approximately 0.7~1 μm, referring FIG. 4) on the deposited adhesive composition and performing the heat-treatment for a proper time with a proper temperature.

Aspect 6. Light Extraction Film

The conductive film (200) was prepared by the same method as the Aspect 1 except for additionally forming the second pattern layer (50) (or the light extraction layer) on the grid electrode layer (30) using the coating composition according to the Preparation Example 2. Specifically, the protrusion of the prism pattern in the second pattern layer (50) was formed toward the support layer (10) with the average pitch of 70 μm and the inclination angle of 50°.

Aspect 7. Conductive Film

The conductive film (200) was prepared by the same method as Aspect 1 except for additionally forming the second pattern layer (50) (or the light extraction layer) on the grid electrode layer (30) using the coating composition according to the Preparation Example 3. Specifically, the protrusion of the prism pattern in the second pattern layer (50) was formed toward the support layer (10) with the average pitch of 70 μm and the inclination angle of 50°. Furthermore, the high refractive index particles (ZrO2) existed in the prism pattern.

Aspects 2 to 5 and Comparative Examples 1 to 7. Film

The film (100) was prepared by the same method as the Aspect 1 except for adjusting the shape of the prism formed on the pattern layer (20) as stated in Table 1. In contrast, Comparative Example 1 is a film without forming the pattern layer (20).

The shape of the pattern layer (20) and the result of the property evaluation for the film (100) according to the aspects and the comparative examples are shown in Table 1.

TABLE 1

|  |  | The First pattern layer | | The Second pattern layer | | Change | | |
| --- | --- | --- | --- | --- | --- | --- | --- | --- |
|  |  | Average pitch(μm) | Angle of inclination(*) | Average pitch(μm) | Angle of inclination(*) | Degree of lifting(μm) | rate of resistance(Ω) | Brightness(nit) |
| Aspect | 1 | 70 | 30 | — | — | — | 5 | 565 |
|  | 2 | 50 | 30 | — | — | — | 5 | 560 |
|  | 3 | 70 | 50 | — | — | — | 5 | 562 |
|  | 4 | 50 | 50 | — | — | — | 5 | 559 |
|  | 5 | 70 | 80 | — | — | — | 5 | 555 |
|  | 6 | 70 | 50 | 70 | 50 | — | 5 | 620 |
|  | 7 | 70 | 50 | 70 | 50 | — | 5 | 650 |
| Comparative | 1 | — | — | — | — | 15 | 88 | 357 |
| Aspect | 2 | 25 | 30 | — | — | 3 | 17 | 480 |
|  | 3 | 5 | 30 | — | — | 5 | 26 | 440 |
|  | 4 | 25 | 50 | — | — | 4 | 21 | 462 |
|  | 5 | 5 | 50 | — | — | 8 | 42 | 412 |
|  | 6 | 25 | 80 | — | — | 6 | 31 | 431 |
|  | 7 | 5 | 80 | — | — | 10 | 54 | 384 |

Through Table 1, it can be shown inn that no lifting occurred between the grid electrode (31) and the support layer (10) even when the support layer (10) was bent, thus the adhesion between the support layer (10) and the grid electrode layer (30) was improved for the aspect films (and the light extraction films) satisfying the defined condition according to the present disclosure. However, for the comparative example films not satisfying the defined condition according to the present disclosure, it can be shown inn that lifting occurred between the grid electrode (31) and the support layer (10) when the support layer (10) was bent, thus there was a space having a certain distance between the support layer (10) and the grid electrode layer (30) because such films could not satisfy the defined condition for the pattern layer (20) according to the present disclosure even if the pattern layer (20) was formed on the support layer (10).

Also, through Table 1, it can be shown inn that the adhesion between the support layer (10) and the grid electrode layer (30) was improved as well as the light extraction efficiency which was additionally improved if the second pattern layer (50) was additionally formed on the grid electrode layer (30) according to Aspects 6 and 7.

Thus, it can be shown inn that the present disclosure has advantageous over the conventional conductive film (200) to provide an electrode for a large area for a curved (or flexible) device. Furthermore, the film (100) according to the present disclosure is suitable for replacing ITO (Indium Tin Oxide) electrodes as a transparent conductive film because it can additionally improve the light gathering efficiency (or the light extraction efficiency) by forming the pattern layer (20) on the grid electrode layer (30).

What is claimed is:

1. A film comprising;
   a support layer wherein at least a certain portion of the supporting layer is curved;
   a pattern layer formed on the support layer having a repeated structure of a protrusion wherein the protrusion is formed toward the support layer and an average pitch of the protrusion is 30 μm or more; and
   a grid electrode layer formed on the pattern layer having an adhesive including a nanowire wherein a grid electrode is formed in the adhesive.

2. The film of claim 1 further comprising a polymer in the support layer.

3. The film of claim 1 further comprising a shape of the protrusion wherein the shape of a cross-sectional area of the protrusion is increased to a direction from the support layer to the grid electrode layer.

4. The film of claim 1 further comprising a prism pattern as a pattern of the pattern layer having an inclination angle range of 10 to 85 degrees.

5. The film of claim 1 further comprising a high refractive index particle in the protrusion of the pattern layer.

6. The film of claim 1 further comprising a filling layer wherein the filling layer is formed to subside the pattern layer and to planarize a surface adjacent to the pattern layer and the support layer.

7. The filling layer of claim 6 further comprising an adhesive and a nanowire.

8. The film of claim 1 further comprising a second pattern layer formed on the grid electrode layer having a repeated structure of a protrusion wherein the protrusion is formed toward the grid electrode layer.

9. The film of claim 8 further comprising an average pitch of the second pattern layer of the protrusion being 30 μm or more.

10. The film of claim 8 further comprising a prism pattern as a pattern of the second pattern layer having an inclination angle range of 10 to 85 degrees.

* * * * *